United States Patent [19]
Oishi

[11] Patent Number: 6,062,209
[45] Date of Patent: May 16, 2000

[54] METHOD OF SLICING A WORKPIECE THROUGH USE OF A WIRE SAW, AND A WIRE SAW

[75] Inventor: Hiroshi Oishi, Annaka, Japan

[73] Assignee: Shin-Etsu Handotai Co., Ltd., Tokyo, Japan

[21] Appl. No.: 09/008,326

[22] Filed: Jan. 20, 1998

[30] Foreign Application Priority Data

Jan. 29, 1997 [JP] Japan ..................................... 9-31312

[51] Int. Cl.$^7$ ....................................................... B28D 1/06
[52] U.S. Cl. ........................... 125/16.01; 457/21; 457/60; 457/446
[58] Field of Search ............................. 125/16.01, 16.02; 457/21, 60, 446; 83/651.1

[56] References Cited

U.S. PATENT DOCUMENTS 3,831,576  8/1974  Mech .
4,441,281  4/1984  Gordiski ..................................... 451/21
5,269,285  12/1993  Toyama et al. ........................ 125/16.01

FOREIGN PATENT DOCUMENTS 9-262826  1/1998  Japan .

*Primary Examiner*—Robert A. Rose
*Assistant Examiner*—George Nguyen
*Attorney, Agent, or Firm*—Oliff & Berridge, PLC

[57] ABSTRACT

There is disclosed a method of slicing a workpiece through use of a wire saw. The workpiece is pressed at a predetermined feed rate against a wire which moves from a wire feed side to a wire take-up side and slices the workpiece into wafers while abrasive grain slurry is fed to the press contact portion between the wire and the workpiece. The feed rate of the workpiece is controlled according to the size of abrasive grains in the abrasive grain slurry, such that a decrease in the slicing stock removal stemming from a decrease in the size of abrasive grains during slicing is compensated with an increase in the slicing stock removal effected by decreasing the feed rate of the workpiece. The method can make the thicknesses of sliced wafers uniform to the extent possible.

8 Claims, 8 Drawing Sheets

METHOD OF SLICING A WORKPIECE THROUGH USE OF A WIRE SAW, AND A WIRE SAW

BACKGROUND OF THE INVENTION

1. Field of the Invention

The present invention relates to an improvement in technique for slicing a workpiece, such as a semiconductor silicon ingot, to obtain wafers.

2. Description of the Related Art

Conventionally, there has been known a method of slicing off wafers from a workpiece such as a semiconductor silicon ingot through use of a workpiece slicing apparatus, i.e. a wire saw. In the wire saw, a fine steel wire is spirally wound and extended among a plurality of rollers such that turns of the wire are equally spaced in the longitudinal direction of the rollers. The wire is fed from a wire feed side to a wire take-up side with or without reciprocal movement. A workpiece is pressed against the thus-fed wire and fed at a predetermined rate while abrasive grain slurry is fed to the press contact portion between the wire and the workpiece, whereby a plurality of wafers are slicing off concurrently. The abrasive grain slurry is a suspension of fine abrasive grains in oil or water-soluble coolant. Since this method can be used to concurrently slice off a number of wafers, it is becoming increasingly popular, replacing a conventional method that employs an inner diameter slicer.

In the method of slicing a workpiece through use of a wire saw, the feed rate of a workpiece is generally held constant or controlled according to a program for maintaining a constant cutting load to the extent possible. The cutting load is a load imposed on a wire 1 when a workpiece W is cut by the wire 1 (FIG. 1). When the workpiece W having a circular cross section is cut, the cutting load is equivalent to the product of the chord length of cut as shown in FIG. 1A and the feed rate of the workpiece W as shown in FIG. 1B. The feed rate of the workpiece W is controlled such that the cutting load becomes as constant as possible, as shown in FIG. 1C.

Abrasive grains contained in abrasive grain slurry effect an actual action of grinding a workpiece when the workpiece is sliced by a wire saw. As the size of abrasive grains decreases due to wear or fracture of abrasive grains themselves, the slicing stock removal decreases; as a result, the thickness of a wafer obtained by slicing increases. As shown in FIG. 2, the thickness of a wafer having a diameter of 200 mm shows a tapered variation of 8 μm to 10 μm as measured after slicing, discounting the wafer's slicing start and end portions, which correspond to approximately ⅒ of the overall depth of cut and at which locations the thickness of the wafer varies significantly. As shown in FIG. 2, in the slicing start and end portions of a wafer, the thickness of the wafer varies significantly since a sudden change in cutting load induces a change in deflection of a wire and a change in wear of the wire itself, or a change in the amount of abrasive grain slurry brought from the wire into a cutting groove.

The thicknesswise taper of a wafer obtained by slicing is difficult to eliminate in the subsequent lapping, etching, and polishing processes. Thus, there has been an eager demand for a method of slicing off wafers through use of a wire saw in such a manner that the degree of the thicknesswise taper of each wafer obtained by slicing is small to thereby provide wafers having an improved uniform thickness.

SUMMARY OF THE INVENTION

The present invention has been conceived in view of the foregoing drawbacks in the prior art. An object of the present invention is to provide a method of slicing a workpiece through use of a wire saw, which method can make the thicknesses of sliced wafers uniform to the extent possible.

The inventors of the present invention have focused on the feed rate of a workpiece and have conducted extensive studies in an attempt to develop a method of slicing off wafers wherein the degree of the thicknesswise taper of each wafer obtained by slicing is reduced to thereby provide wafers having as uniform a thickness as possible. As a result, the inventors have found that the thickness of a wafer obtained by slicing varies with the feed rate of a workpiece during slicing. The mechanism of this phenomenon will be described below.

(1) As shown schematically in FIG. 3, as the feed rate of a workpiece is increased, a cutting pressure imposed on the workpiece increases, and thus the thickness of a slurry layer adhering to a wire decreases due to squeezing. As a result, the slicing stock removal decreases. By contrast, as the feed rate of a workpiece is decreased, the cutting pressure decreases, and thus the slurry layer thickness increases. As a result, the slicing stock removal increases.

FIG. 4 shows a graph representing a variation in the thickness of wafers which were sliced off at different feed rates of a workpiece. As seen from FIG. 4, as the feed rate of a workpiece is increased, the slicing stock removal decreases; consequently, the thickness of a wafer increases. The results shown in FIG. 4 correspond to the relation between the feed rate of a workpiece and the slicing stock removal as shown schematically in FIG. 3.

The above description is summarized below in Table 1.

TABLE 1

| Feed rate of workpiece | Increase | Decrease |
|---|---|---|
| Thickness of slurry layer adhering to wire | Decrease | Increase |
| Slicing stock removal | Decrease | Increase |
| Thickness of wafer | Increase | Decrease |

According to FIG. 3, as the feed rate of a workpiece increases, and thus the cutting pressure increases, the number of abrasive grain layers in a slurry layer adhering to a wire decreases to a single abrasive grain layer, resulting in a reduction in the thickness of the slurry layer. In actuality, it is conceivable that an increase in the cutting pressure causes wear and fracture of abrasive grains themselves with a resultant reduction in average grain size, resulting in a reduction in the thickness of the slurry layer.

(2) The above-mentioned relation between the feed rate of a workpiece and the thickness of a wafer obtained by slicing can also be explained in terms of wear of a wire.

The relation between the feed rate of a workpiece and the amount of wear of a wire is represented by the following expression:

$$\text{Amount of wear of wire} = k \text{ (cutting load/new-wire feed rate)}$$
$$= k \text{ (chord length of cut} \times \text{feed rate of workpiece)/new-wire feed rate}$$

where k is a constant. For example, when the wire feed rate is 500 m/min, and the wire is moved forward for 36 seconds and then backward for 24 seconds in a repeated manner, the wire is moved forward at a net rate of 100 m/min (500 m/min ×(36−24)/(36+24)). That is, the new-wire feed rate is 100 m/min.

According to the above expression, as the feed rate of a workpiece is increased while the new-wire feed rate is held constant, the amount of wear of a wire increases. As a result, the slicing stock removal decreases, resulting in an increase of the thickness of a wafer obtained by slicing. On the contrary, as the feed rate of a workpiece is decreased while the new-wire feed rate is held constant, the thickness of a wafer obtained by slicing decreases.

The above description is summarized below in Table 2.

TABLE 2

| Feed rate of workpiece | Increase | Decrease |
|---|---|---|
| Cutting load | Increase | Decrease |
| Amount of wear of wire (while new-wire feed rate is held constant) | Increase | Decrease |
| Slicing stock removal | Decrease | Increase |
| Thickness of wafer | Increase | Decrease |

In actual slicing, the above-described mechanisms (1) and (2) are conceivably in effect concurrently. In any event, as the feed rate of a workpiece is increased, the thickness of a wafer obtained by slicing increases. On the contrary, as the feed rate of a workpiece is decreased, the thickness of a wafer obtained by slicing decreases. Through utilization of this phenomenon, the present inventors have accomplished the present invention.

The present invention provides a method of slicing a workpiece through use of a wire saw, comprising the steps of pressing the workpiece at a predetermined feed rate against a wire moving from a wire feed side to a wire take-up side and slicing the workpiece into wafers while abrasive grain slurry is fed to the press contact portion between the wire and the workpiece, wherein the feed rate of the workpiece is controlled according to the size of abrasive grains in the abrasive grain slurry.

In the present invention, the above-mentioned control is performed so as to compensate a decrease in the slicing stock removal stemming from a decrease in the size of abrasive grains during slicing the workpiece with an increase in the slicing stock removal effected by decreasing the feed rate of the workpiece.

By controlling the feed rate of a workpiece according to the size of abrasive grains in abrasive grain slurry so as to compensate a decrease in the slicing stock removal stemming from a decrease in the size of abrasive grains during slicing the workpiece with an increase in the slicing stock removal effected by decreasing the feed rate of the workpiece, the degree of the thicknesswise taper of a wafer (as shown in FIG. 2) obtained by slicing is decreased. Thus, a wafer having an improved uniform thickness is provided.

Preferably, as shown in FIG. 6A, the feed rate of a workpiece is decreased linearly with the depth of cut in the workpiece. Alternatively, as shown in FIG. 7A, the feed rate of a workpiece is decreased substantially parabolically with the depth of cut in the workpiece until the depth of cut exceeds half of the overall depth of cut. By decreasing the feed rate of a workpiece in this manner, a wafer having an improved uniform thickness is obtained by slicing as shown in FIGS. 6B and 7B.

The present invention also provides a wire saw comprising wire moving means for moving a wire from a wire feed side to a wire take-up side, workpiece pressing means for pressing the workpiece against the wire at a predetermined feed rate, slurry feed means for feeding abrasive grain slurry to the press contact portion between the wire and the workpiece, and control means for controlling the workpiece pressing means, wherein the control means can be programmed so as to change the feed rate of the workpiece arbitrarily and continuously in order to control the feed rate of the workpiece according to the size of abrasive grains in the abrasive grain slurry.

Since the workpiece pressing means of the wire saw can be programmed so as to feed a workpiece at a certain rate or a continuously variable rate in order to control the feed rate of the workpiece according to the size of abrasive grains in the abrasive grain slurry, there can be prevented an increase in the thickness of a wafer stemming from a decrease in the size of abrasive grains during slicing as shown in FIG. 2. Thus, a wafer having an improved uniform thickness, not a thicknesswise taper, is obtained by slicing.

A conventional method of slicing a workpiece through use of a wire saw has involved the problem that a wafer obtained by slicing has significant thicknesswise taper as compared with the case of slicing through use of an inner diameter slicer. By contrast, according to the present invention, the degree of the thicknesswise taper of a wafer obtained by slicing can be reduced, so that wafers having an improved uniform thickness are obtained by slicing through use of a wire saw. This brings about various effects such as a reduction in the formation of a saw mark in a slicing process, the attainment of a uniform width of chamfer in a subsequent chamfering process, and a reduction in a lapping stock removal in a subsequent lapping process.

DESCRIPTION OF THE PREFERRED EMBODIMENTS

Embodiments of the present invention will now be described in detail with reference to the drawings.

Figure 1A:
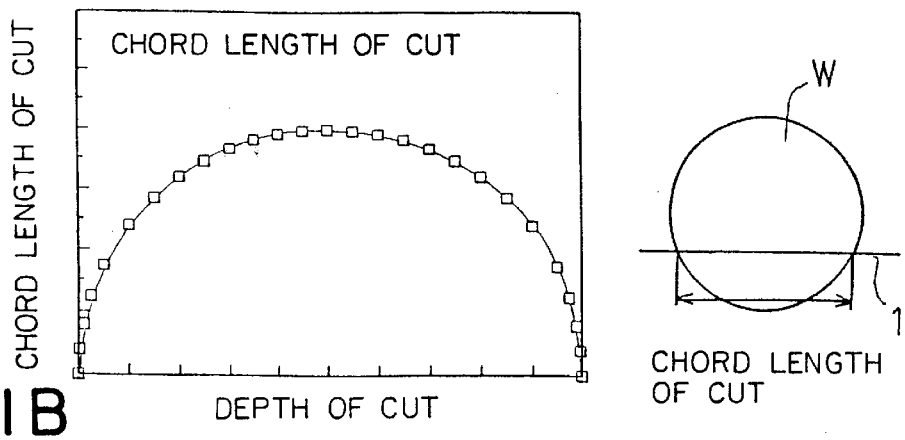
FIGS. 1A–1C are graphs showing the relation among the chord length of cut, the feed rate of a workpiece, and a cutting load.
Figure 1B:
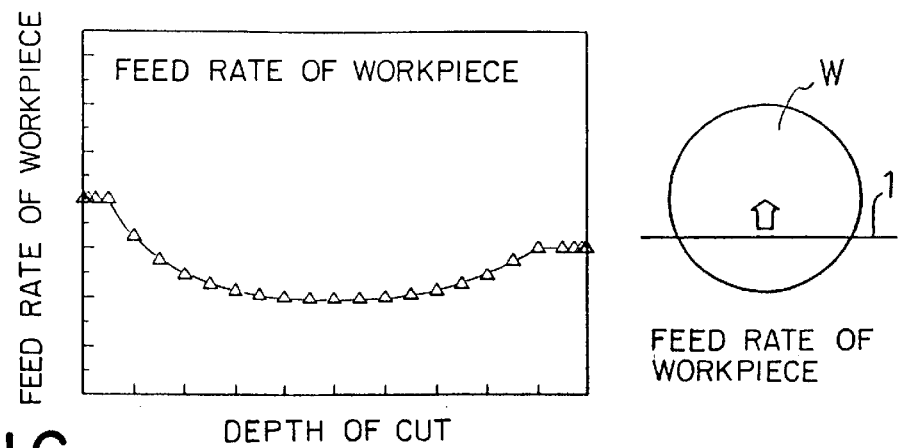
Figure 1C:
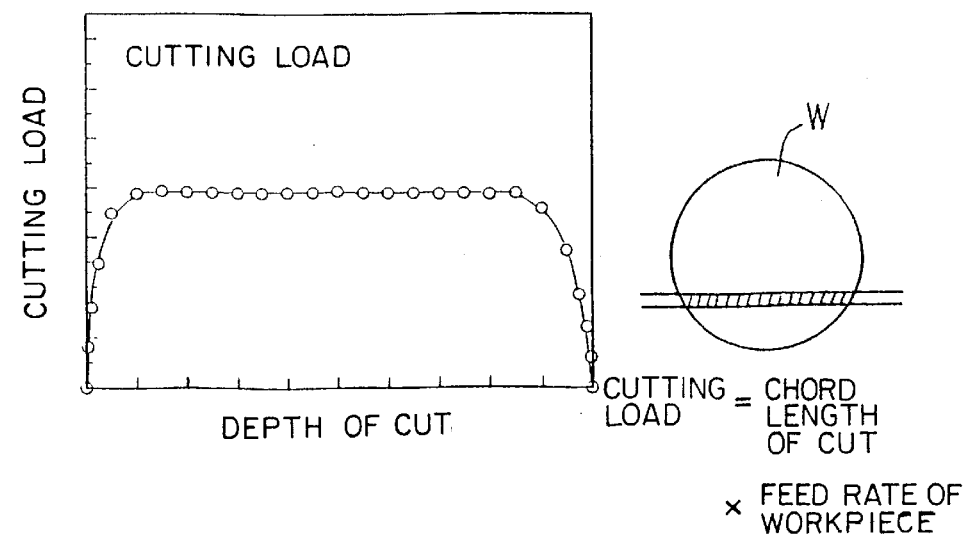
Figure 2:
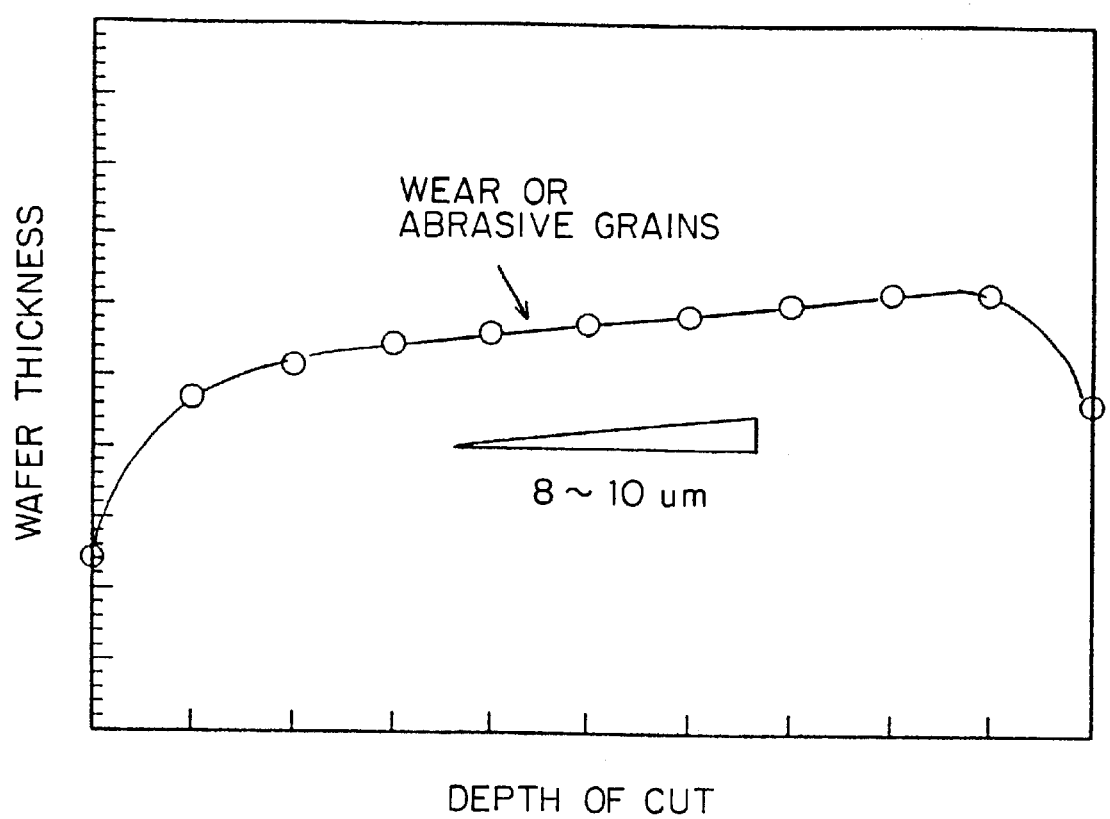
FIG. 2 is a graph showing a variation in the thickness of a wafer obtained by a conventional slicing method with the depth of cut.
Figure 3:
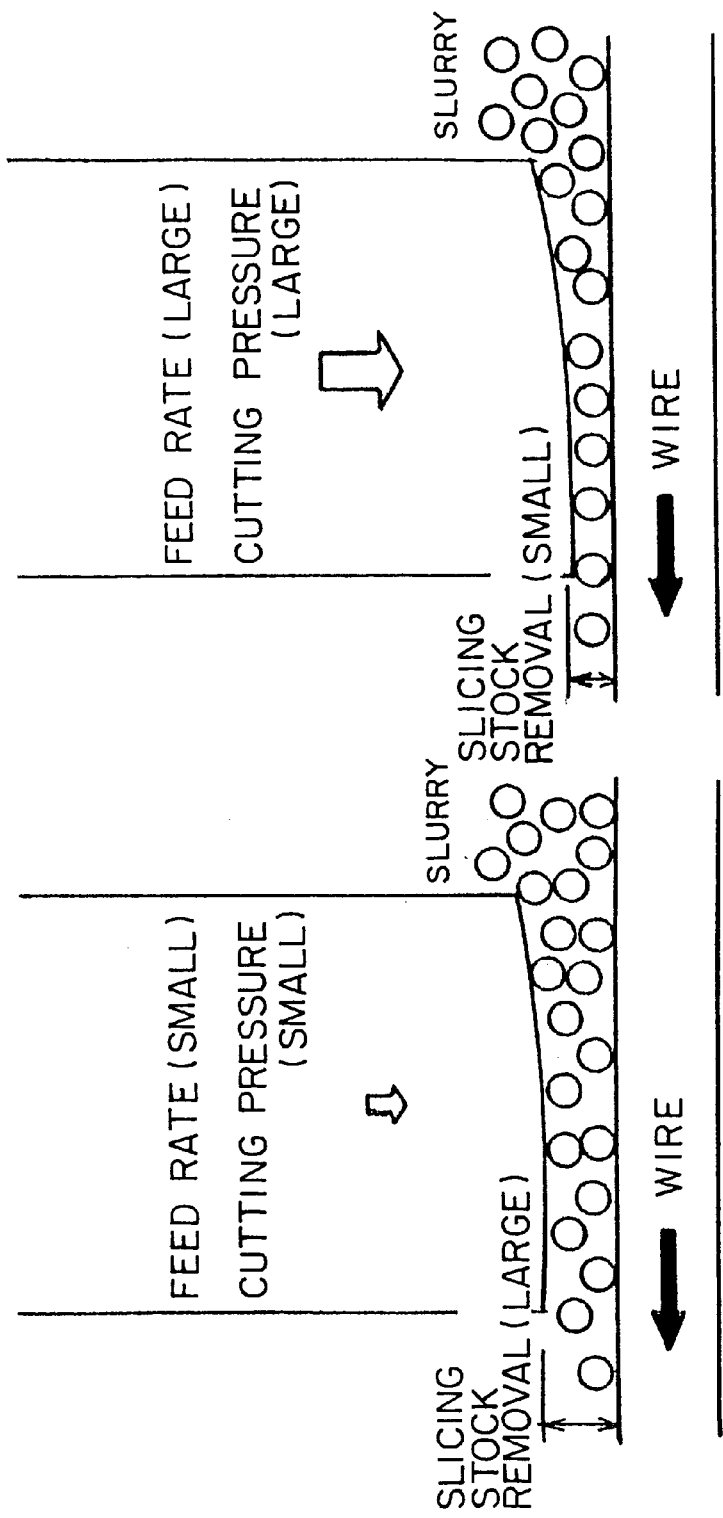
FIG. 3 is a schematic view showing the relation between a variation in the feed rate of a workpiece and a variation in the slicing stock removal.
Figure 4:
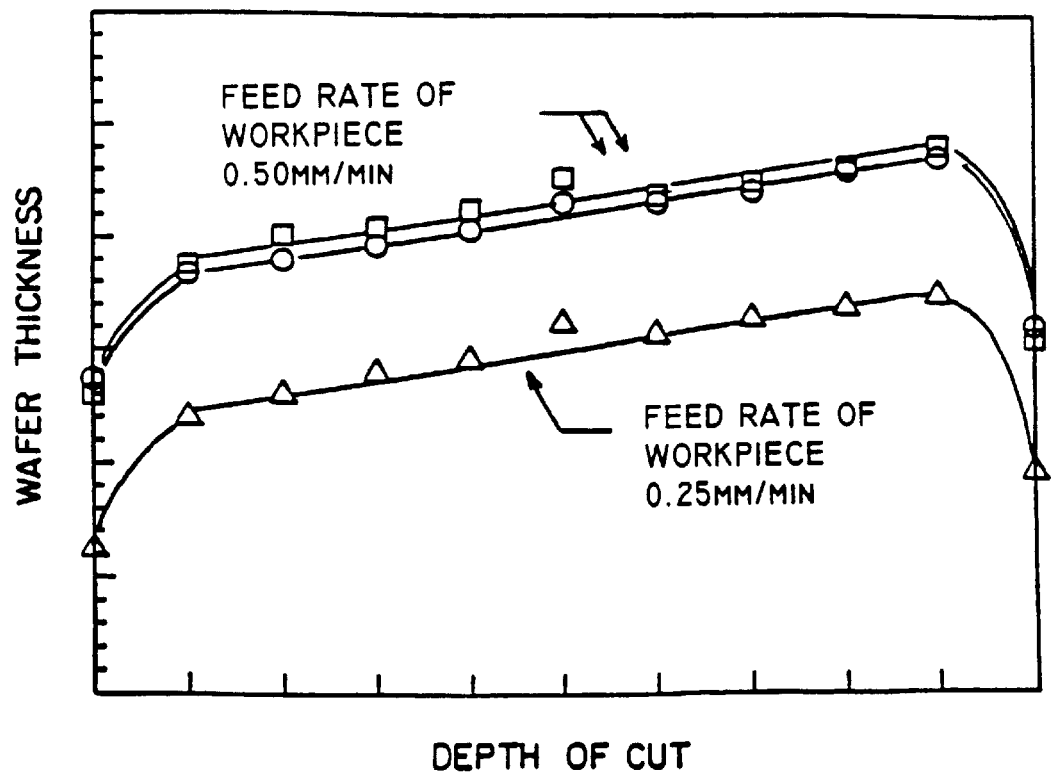
FIG. 4 is a graph showing a variation of the thickness of a wafer with the depth of cut at a workpiece feed rate of 0.50 mm/min (○ and □) and 0.25 mm/min (Δ)
Figure 5:
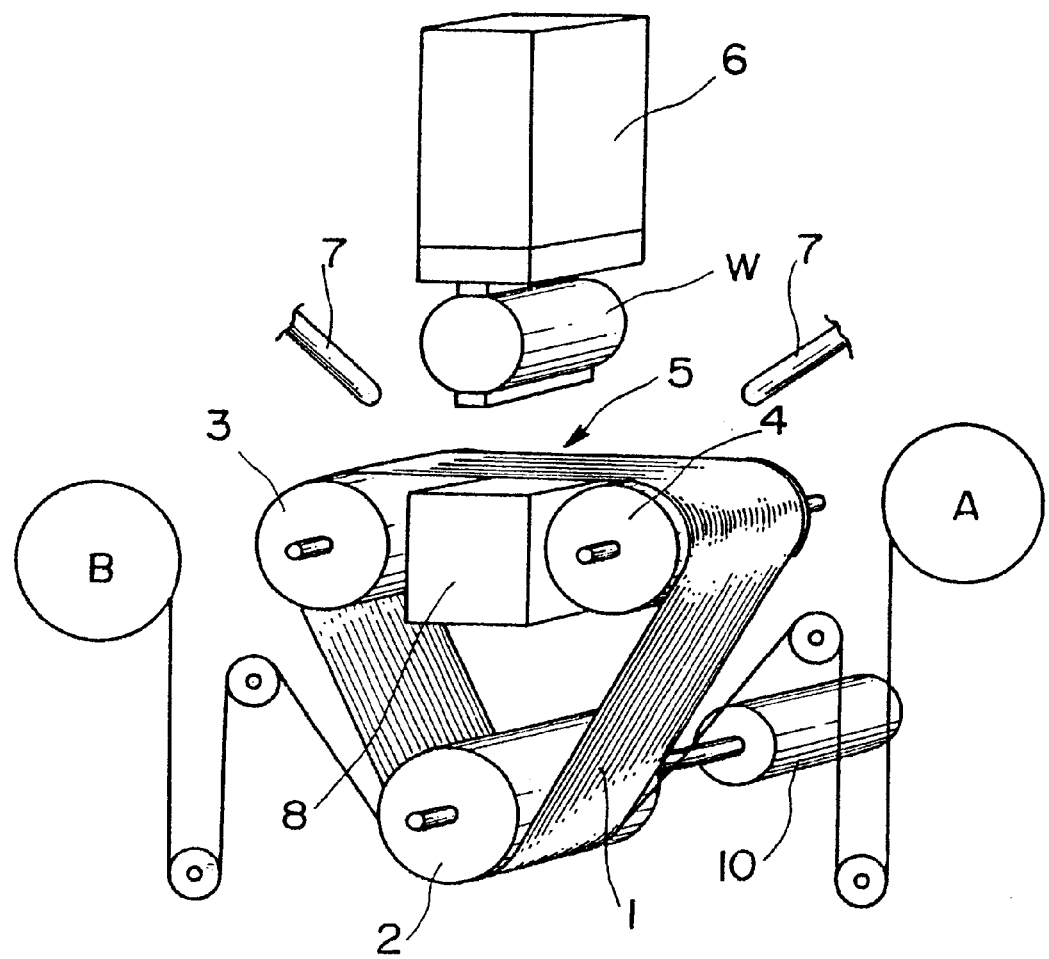
FIG. 5 is a schematic view showing the configuration of a wire saw of the present invention.

A wire saw used in a method of slicing a workpiece according to the present invention is adapted to slice a silicon ingot manufactured by, for example, the Czochralski method into wafers. As shown in FIG. 5, a single steel wire 1 extending from a wire feed section A is spirally wound around three rollers 2, 3, and 4 such that turns of the wire 1 are spaced at a predetermined pitch, and extends toward a wire take-up section B. The lower roller 2 serves as a driving roller for moving the wire 1 at a predetermined linear rate. The upper rollers 3 and 4 are arranged at the same height, and a working section 5 is formed therebetween.

A workpiece holder 6 serving as workpiece pressing means and nozzles 7 serving as slurry feed means for feeding abrasive grain slurry (a suspension of fine abrasive grains in oil or water-soluble coolant) toward the working section 5 are disposed above the working section 5. The workpiece holder 6 is adapted to hold the ingot W and to be vertically movable through the effect of unillustrated lifting means. This lifting means is connected to unillustrated control means which can be programmed so as to change the feed rate of a workpiece arbitrarily and continuously. Under control of the control means, the workpiece W is fed at a predetermined feed rate while being pressed against the wire 1.

A slurry receiver 8 for receiving the abrasive grain slurry is disposed under the working section 5.

The driving roller 2 is rotatively driven by a drive motor 10 serving as wire moving means, whereby the wire W is moved from the wire feed section A to the wire take-up section B.

In the present invention, the feed rate of a workpiece is controlled according to the size of abrasive grains in the abrasive grain slurry to thereby reduce the degree of the thicknesswise taper of a wafer obtained by slicing. In progress of slicing off a wafer with a wire saw, the size of abrasive grains in the abrasive grain slurry decreases, and thus the slicing stock removal decreases, resulting in an increase in the thickness of a wafer obtained by slicing. By contrast, as the feed rate of a workpiece is decreased, the slicing stock removal increases, resulting in a decrease in the thickness of a wafer obtained by slicing. Accordingly, in order to reduce the degree of the thicknesswise taper of a wafer obtained by slicing, a decrease in the slicing stock removal stemming from a decrease in the size of abrasive grains during slicing the workpiece is compensated with an increase in the slicing stock removal effected by decreasing the feed rate of a workpiece.

In order to control the feed rate of a workpiece according to the size of abrasive grains in the abrasive grain slurry, for example, an increase in the thickness of a wafer which would be effected by slicing a workpiece at a conventional workpiece feed rate is estimated in advance, and the feed rate of a workpiece is reduced so as to compensate the estimated increase in the thickness of a wafer.

Figure 6A:
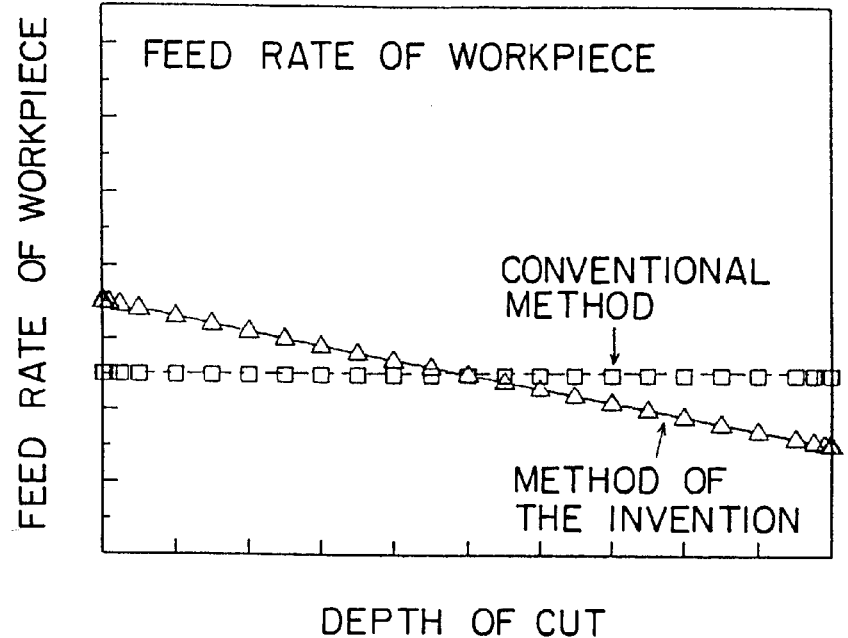
FIG. 6A is a graph showing an example of control of the feed rate of a workpiece (Δ) in a method of slicing a workpiece according to the present invention in comparison with a conventional method wherein the feed rate of a workpiece is held constant (□)
Figure 6B:
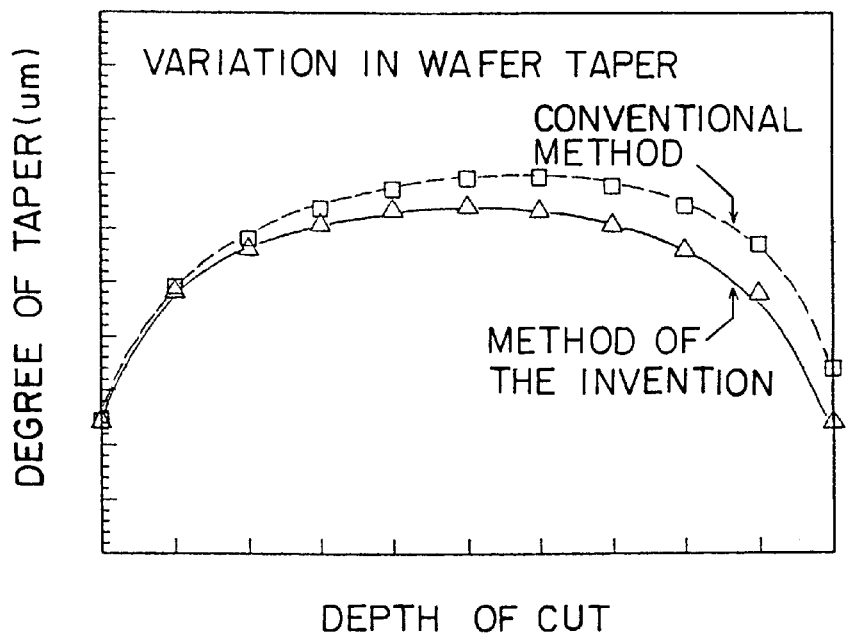
FIG. 6B is a graph showing a variation in wafer taper indicative of an estimated variation in the thickness of a wafer obtained by slicing while the feed rate of a workpiece is varied as shown in FIG. 6A.

FIG. 6A shows an example of control of the feed rate of a workpiece in comparison with a conventional method wherein the feed rate of a workpiece is held constant. In this example, the feed rate of a workpiece is linearly decreased with the depth of cut in the workpiece. By linearly decreasing the feed rate of a workpiece with the depth of cut in the workpiece, the degree of the thicknesswise taper of a wafer obtained by slicing is reduced, so that a wafer having an improved uniform thickness is obtained as compared with the case where the feed rate of a workpiece is held constant, as shown in FIG. 6B.

Figure 7A:
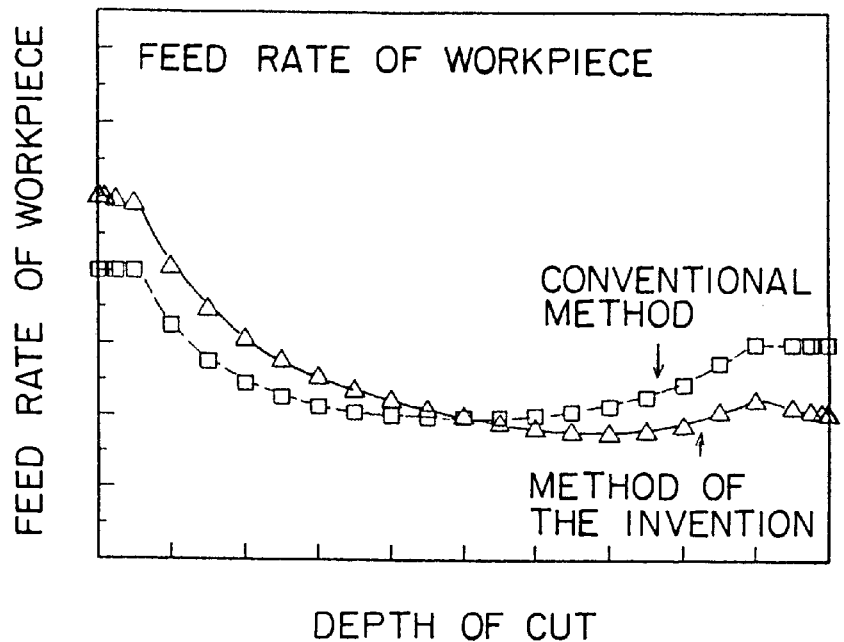
FIG. 7A is a graph showing another example of control of the feed rate of a workpiece (Δ) in the method of slicing a workpiece according to the present invention in comparison with a conventional method wherein the feed rate of a workpiece is controlled so as to hold a cutting load as constant as possible (□)
Figure 7B:
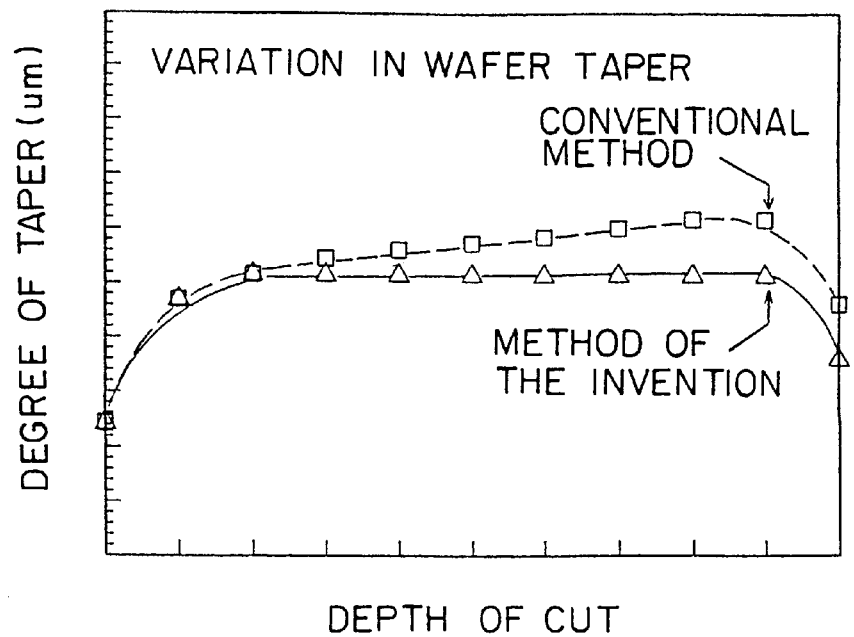
FIG. 7B is a graph showing a variation in wafer taper indicative of an estimated variation in the thickness of a wafer obtained by slicing while the feed rate of a workpiece is varied as shown in FIG. 7A.

FIG. 7A shows an example of control of the feed rate of a workpiece in comparison with a conventional method wherein the feed rate of a workpiece is controlled so as to hold a cutting load as constant as possible. In this example, the feed rate of a workpiece is decreased substantially parabolically with the depth of cut in the workpiece until the depth of cut exceeds half of the overall depth of cut. By substantially parabolically decreasing the feed rate of a workpiece until the depth of cut in the workpiece exceeds half of the overall depth of cut, preferably at least 7/10 of the overall depth of cut, the thickness of a wafer obtained by slicing becomes substantially uniform, discounting the cutting start and end portions, as shown in FIG. 7B.

When the feed rate of a workpiece is to be decreased as described above, the inclination of the decrease is varied according to the type and diameter of a workpiece and conditions of slicing with a wire saw to thereby be optimized.

EXAMPLES

The present invention will next be described by way of example.

Example

A glass plate was bonded onto each of the top and bottom of a silicon ingot having a diameter of 200 mm and manufactured by the Czochralski method. Through use of the wire saw shown in FIG. 5, the thus-prepared ingot was sliced while the feed rate of the ingot was varied in accordance with the feed rate control pattern of the present invention shown in FIG. 7A, whereby a wafer having a thickness of 600 $\mu$m was obtained. The thickness of the thus-obtained wafer was measured. The result is shown in FIG. 8 in terms of wafer taper.

Figure 8:
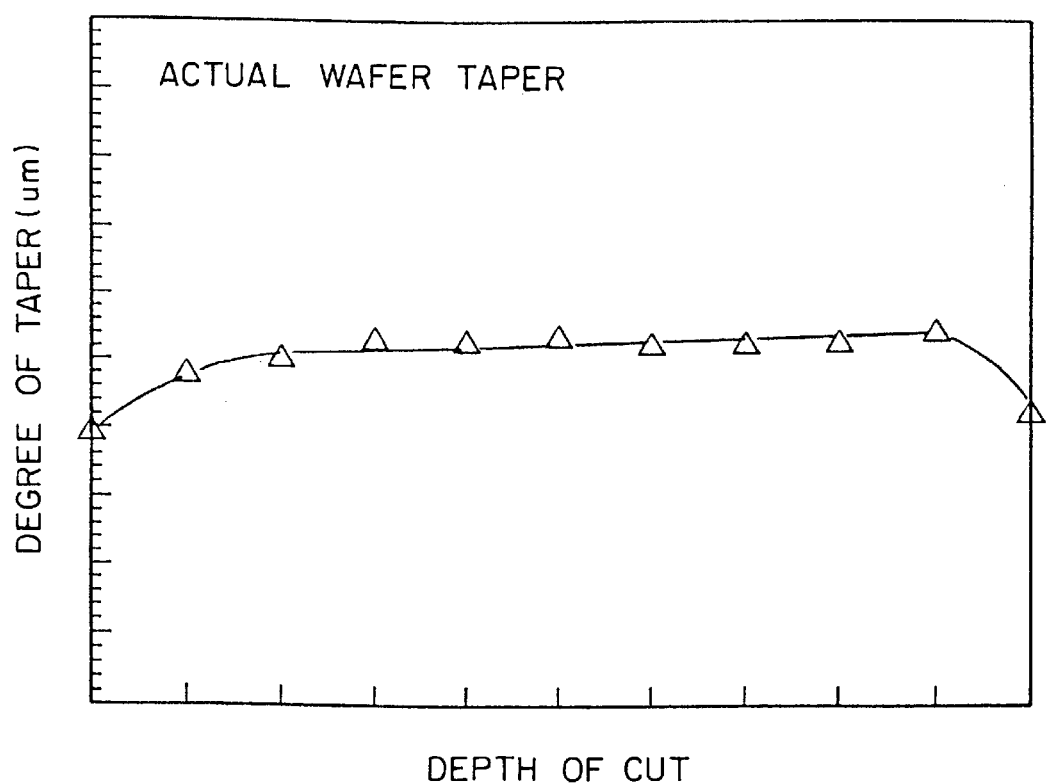
FIG. 8 is a graph showing an actually obtained wafer taper in Example.

As seen from FIG. 8, a variation in the thickness of the wafer was merely 1.5 $\mu$m, discounting the slicing start and end portions at which locations the thickness of the wafer obtained by slicing varied sharply.

For the purpose of comparison, a silicon ingot having a diameter of 200 mm was sliced in a manner similar to that described above except that the feed rate of the ingot was varied in accordance with the feed rate control pattern of the conventional method in FIG. 7A, whereby a wafer having a thickness of 600 $\mu$m was obtained. The thickness of the thus-obtained wafer was measured. A variation in the thickness of the wafer obtained by slicing was 9.5 $\mu$m, discounting the slicing start and end portions at which locations the thickness of the wafer varied sharply.

The present invention is not limited to the above-described embodiments. The above-described embodiments are mere examples, and those having the substantially same structure as that described in the appended claims and providing the similar action and effects are included in the scope of the present invention.

What is claimed is:

1. A method of slicing a workpiece through use of a wire saw, the method comprising the steps of:

pressing the workpiece at a predetermined feed rate against a wire moving from a wire feed side to a wire take-up side and slicing the workpiece into wafers;

feeding abrasive grain slurry to the press contact portion between the wire and the workpiece; and controlling the feed rate of the workpiece according to the size of abrasive grains in the abrasive grain slurry.

2. A method of slicing a workpiece through use of a wire saw according to claim 1, wherein the control is performed such that a decrease in the slicing stock removal stemming from a decrease in the size of abrasive grains during slicing is compensated with an increase in the slicing stock removal effected by decreasing the feed rate of the workpiece.

3. A method of slicing a workpiece through use of a wire saw according to claim 1, wherein the feed rate of a workpiece is decreased linearly with the depth of cut in the workpiece.

4. A method of slicing a workpiece through use of a wire saw according to claim 2, wherein the feed rate of a workpiece is decreased linearly with the depth of cut in the workpiece.

5. A method of slicing a workpiece through use of a wire saw according to claim 1, wherein the feed rate of a workpiece is decreased substantially parabolically with the depth of cut in the workpiece until the depth of cut exceeds half of the overall depth of cut.

6. A method of slicing a workpiece through use of a wire saw according to claim 2, wherein the feed rate of a workpiece is decreased substantially parabolically with the depth of cut in the workpiece until the depth of cut exceeds half of the overall depth of cut.

7. A wire saw comprising:

wire moving means for moving a wire from a wire feed side to a wire take-up side;

workpiece pressing means for pressing a workpiece against the wire at a predetermined feed rate;

slurry feed means for feeding abrasive grain slurry to the press contact portion between the wire and the workpiece; and control means for controlling the workpiece pressing means, the control means being programmed so as to change the feed rate of the workpiece arbitrarily and continuously in order to control the feed rate of the workpiece according to the size of abrasive grains in the abrasive grain slurry.

8. A wire saw, comprising:

a wire moving device that moves a wire from a wire feed side to a wire take-up side;

a workpiece holder that presses a workpiece against the wire at a predetermined feed rate;

a slurry feeder that feeds an abrasive grain slurry to a contact portion between the wire and the workpiece; and a controller that controls the workpiece holder, the controller being programmed to change the feed rate of the workpiece arbitrarily and continuously to control the feed rate of the workpiece according to the size of the abrasive grains in the abrasive grain slurry.

* * * * *